US011747250B2

(12) United States Patent
Koo et al.

(10) Patent No.: US 11,747,250 B2
(45) Date of Patent: Sep. 5, 2023

(54) IMPACT TEST APPARATUS AND IMPACT TEST METHOD

(71) Applicants: Samsung Display Co., LTD., Yongin-si (KR); Korea Advanced Institute of Science and Technology, Daejeon (KR)

(72) Inventors: Minsang Koo, Seongnam-si (KR); Do Kyung Kim, Daejeon (KR); Sanghoon Kim, Hwaseong-si (KR); Seungho Kim, Asan-si (KR); Seongjin Hwang, Suwon-si (KR); Jung Hoon Kong, Daejeon (KR); Dong Gyu Kim, Daejeon (KR)

(73) Assignees: SAMSUNG DISPLAY CO., LTD., Yongin-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 69 days.

(21) Appl. No.: 17/546,655

(22) Filed: Dec. 9, 2021

(65) Prior Publication Data

US 2022/0299413 A1    Sep. 22, 2022

(30) Foreign Application Priority Data

Mar. 16, 2021 (KR) .................. 10-2021-0034253

(51) Int. Cl.
*G01N 3/303* (2006.01)
*G01N 3/30* (2006.01)
*G01M 7/08* (2006.01)

(52) U.S. Cl.
CPC .............. *G01N 3/303* (2013.01); *G01N 3/30* (2013.01); *G01M 7/08* (2013.01);
(Continued)

(58) Field of Classification Search
CPC ................... G01N 3/303; G01N 3/30; G01N 2203/0033; G01N 2203/0282;
(Continued)

(56) References Cited

U.S. PATENT DOCUMENTS

| 4,640,120 A * | 2/1987 | Garritano ............... G01N 3/303 73/12.13 |
| 2003/0209053 A1 * | 11/2003 | McNamara .............. G01N 3/52 73/12.02 |

(Continued)

FOREIGN PATENT DOCUMENTS

| CN | 109297842 | 2/2019 |
| CN | 210376020 | 4/2020 |

(Continued)

*Primary Examiner* — Jonathan M Dunlap
(74) *Attorney, Agent, or Firm* — KILE PARK REED & HOUTTEMAN PLLC

(57) ABSTRACT

An impact test apparatus includes a base plate having an upper surface on which a specimen is placed, a collision member that collides with the specimen, a dropping unit that drops the collision member from an upper area of the specimen to the specimen and adjusts a height that the collision member drops, a velocity measurement unit that measures a collision velocity of the collision member when the collision member collides with the specimen, and an evaluation unit that produces a representative value that is a collision velocity at which a probability of breakage of the specimen is about 50%, and evaluates an impact resistance of the specimen based on the representative value.

20 Claims, 6 Drawing Sheets

(52) U.S. Cl.
CPC .............. *G01N 2203/0033* (2013.01); *G01N 2203/0076* (2013.01); *G01N 2203/0282* (2013.01); *G01N 2203/04* (2013.01); *G01N 2203/0676* (2013.01)

(58) Field of Classification Search
CPC ....... G01N 2203/04; G01N 2203/0676; G01N 2203/0076; G01M 7/08
See application file for complete search history.

(56) References Cited

U.S. PATENT DOCUMENTS

| | | | | |
|---|---|---|---|---|
| 2007/0125152 | A1* | 6/2007 | Brankov | G01N 3/303 |
| | | | | 73/12.01 |
| 2008/0256685 | A1* | 10/2008 | Lampe | G01M 7/08 |
| | | | | 73/12.14 |
| 2009/0199625 | A1* | 8/2009 | Kojovic | B02C 19/0025 |
| | | | | 73/865.5 |

FOREIGN PATENT DOCUMENTS

| | | |
|---|---|---|
| KR | 10-2011-0132655 | 12/2011 |
| KR | 10-1229618 | 2/2013 |
| KR | 10-2015-0087648 | 7/2015 |
| KR | 10-2018-0063940 | 6/2018 |

* cited by examiner

IMPACT TEST APPARATUS AND IMPACT TEST METHOD

CROSS-REFERENCE TO RELATED APPLICATION(S)

This application claims priority to and benefits of Korean Patent Application No. 10-2021-0034253 under 35 U.S.C. § 119, filed on Mar. 16, 2021 in the Korean Intellectual Property Office, the entire contents of which are incorporated herein by reference.

BACKGROUND

1. Technical Field

The embodiments relate to an impact test apparatus and impact test method for evaluating impact resistance of a specimen.

2. Description of the Related Art

Flat panel display devices are replacing cathode ray tube display devices due to their light weight and thinness. Examples of such flat panel display devices include liquid crystal display devices and organic light-emitting element display devices.

The display device may include a cover window for protecting a display panel. The cover window is required to have high impact resistance against impacts applied from inside or from outside the display device. Therefore, an impact test method capable of accurately evaluating the impact resistance of the cover window is desired.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide an impact test apparatus with improved reliability of the impact resistance evaluation.

Embodiments also provide an impact test method with improved reliability of the impact resistance evaluation.

Additional features of the embodiments will be set forth in the description which follows, and in part will be apparent from the description, or may be learned by practice of the embodiments.

An impact test apparatus according to an embodiment may include a base plate including an upper surface on which a specimen is placed, a collision member that collides with the specimen, a dropping unit that drops the collision member from an upper area of the specimen to the specimen and adjusts a height that the collision member drops, a velocity measurement unit that measures a collision velocity of the collision member when the collision member collides with the specimen, and an evaluation unit that produces a representative value that is a collision velocity at which a probability of breakage of the specimen is about 50%, and evaluates an impact resistance of the specimen based on the representative value.

In an embodiment, the evaluation unit may produce the representative value based on at least one a first collision velocity and at least one second collision velocity. The at least one first collision velocity may selected among collision velocities at which the specimen is not broken. The at least one second collision velocity may be selected among the collision velocities at which the specimen is broken.

In an embodiment, a number of first collision velocities selected among the collision velocities at which the specimen is not broken may be equal to a number of second collision velocities selected among the collision velocities at which the specimen is broken.

In an embodiment, the evaluation unit may produce the representative value as an average value of the at least one first collision velocity and the at least one second collision velocity.

In an embodiment, the impact test apparatus may further include a fixing member that fixes the specimen to the upper surface of the base plate and is movable in a direction perpendicular to a dropping direction of the collision member.

In an embodiment, the dropping unit may include a clamping member that selectively clamps and unclamps the collision member so that the collision member is dropped towards the specimen.

An impact test apparatus according to an embodiment may include a base plate having a side surface on which a specimen is placed, a collision member that collides with the specimen, a shooting unit that shoots the collision member from a side area of the specimen to the specimen and adjusts a shooting velocity of the collision member, a velocity measurement unit that measures a collision velocity of the collision member when the collision member collides with the specimen, and an evaluation unit that produces a representative value that is a collision velocity at which a probability of breakage of the specimen is about 50%, and evaluates an impact resistance of the specimen based on the representative value.

In an embodiment, the evaluation unit may produce the representative value based on at least one first collision velocity and at least one second collision velocity. The at least one first collision velocity may be selected among the collision velocities at which the specimen is not broken. The at least one second collision velocity may be selected among the collision velocity when the specimen is broken.

In an embodiment, a number of first collision velocities selected among the collision velocities at which the specimen is not broken may be equal to a number of the second collision velocities selected among the collision velocities at which the specimen is broken.

In an embodiment, the evaluation unit may produce the representative value as an average value of the at least one first collision velocity and the at least one second collision velocity.

In an embodiment, the impact test apparatus may further include a fixing member that fixes the specimen to the side surface of the base plate and is movable in a direction perpendicular to a shooting direction of the collision member.

In an embodiment, the shooting unit may include a supporting member extending in a shooting direction of the collision member, and a rotating member that rotates about a rotational axis extending in a direction perpendicular to the shooting direction of the collision member and contacts the collision member such that the collision member is shot to the specimen. The supporting member may include a groove in which the collision member is placed. The rotating member may have an adjustable rotation speed.

An impact test method according to an embodiment may include repeatedly colliding a collision member with a specimen, measuring collision velocities at which the collision member collides, obtaining information about whether the specimen is broken, calculating a representative value representing a collision velocity at which a probability of breakage of the specimen is about 50%, and evaluating an impact resistance of the specimen based on the representative value.

In an embodiment, the repeatedly colliding of the collision member may include changing each of the collision velocities at which the collision member collides with the specimen.

In an embodiment, the repeatedly colliding of the collision member may include colliding the collision member with a first specimen at a predetermined collision velocity, in case that the first specimen is not broken, colliding the collision member with the first specimen at another collision velocity greater than the predetermined collision velocity, in case that the first specimen is broken, replacing the first specimen with a second specimen, and colliding the collision member with the second specimen at another collision velocity less than the predetermined collision velocity.

In an embodiment, the repeatedly colliding of the collision member may include, in case that the first specimen is not broken, moving the first specimen that a collision point of the collision member with respect to the first specimen is changed.

In an embodiment, the first specimen may be moved in a direction perpendicular to a collision direction of the collision member.

In an embodiment, the representative value may be calculated based on at least one first collision velocity and at least one second collision velocity. The at least one first collision velocity may be selected among the collision velocities at which the specimen is not broken. The at least one second collision velocity may be selected among the collision velocities at which the specimen is broken.

In an embodiment, a number of the first collision velocities selected among the collision velocities at which the specimen is not broken may be equal to a number of the second collision velocity.

In an embodiment, the calculating of the representative value may include calculating an average value of the at least one first collision velocity and the at least one second collision velocities selected among the collision velocities at which the specimen is broken.

The impact test apparatus may produce the representative value representing the collision velocity of the collision member when the probability of breakage of the specimen is about 50%, and may evaluate the impact resistance of the specimen based on the representative value. The influence of surface defects of the specimen may be accounted for the evaluation of the impact resistance of the specimen. Accordingly, it is possible to quantitatively evaluate the impact resistance of the specimen, and effectively compare the impact resistance between different specimens. Accordingly, the reliability of the impact resistance evaluation by the impact test apparatus may be improved.

It is to be understood that both the foregoing general description and the following detailed description are explanatory and are intended to provide further explanation of the embodiments.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
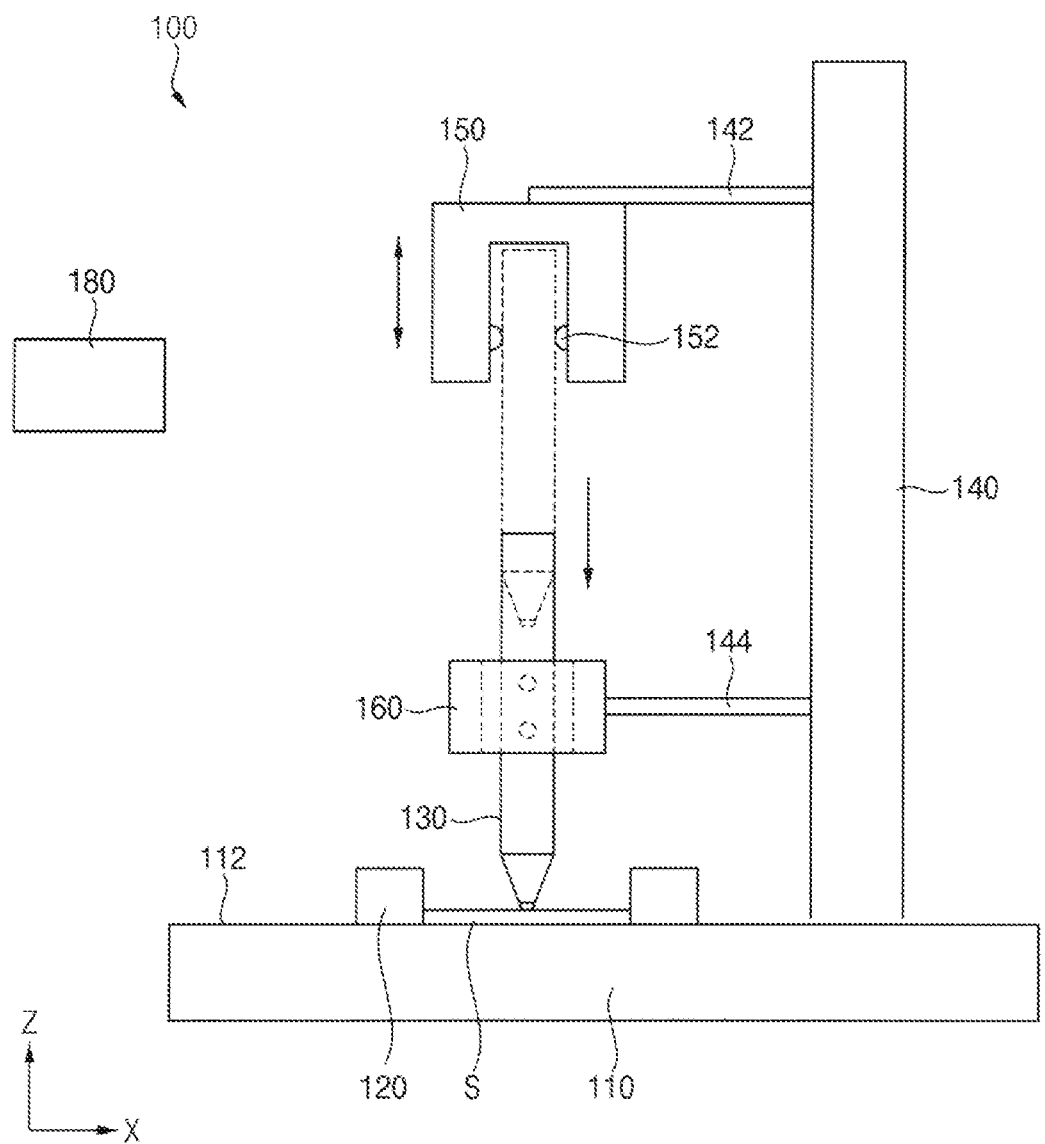
FIG. 1 is a front view schematically illustrating an impact test apparatus according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the description hereinafter, x-, y-, and z-axes mean, for example, directions substantially perpendicular to each other on a three-dimensional space. Accordingly, only two axes among the x-, y-, and z-axes are shown in the drawings, and the direction of the one remaining axis may be recognized.

"About," "substantially," or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

It will be understood that when an element (or a region, a layer, a portion, or the like) is referred to as "being on", "connected to" or "coupled to" another element in the specification, it can be directly disposed on, connected, or coupled to another element mentioned above, or intervening elements may be disposed therebetween.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a front view schematically illustrating an impact test apparatus according to an embodiment.

Referring to FIG. 1, an impact test apparatus 100 according to an embodiment may include a base plate 110, a fixing member 120, a collision member 130, a guide bar 140, a dropping unit 150, a velocity measurement unit 160, and an evaluation unit 180.

The base plate 110 may be in a shape of a flat plate having a thickness. For example, an upper surface 112 of the base plate 110 may be substantially parallel to an x-y plane.

A specimen S may be placed on the upper surface 112 of the base plate 110. The specimen S is an object of the impact test apparatus 100, for example, at least a portion of the shape of the specimen S may be a flat plate having a thickness. For example, the specimen S may include (or may be) a cover window included in a display device. For example, the cover window may include ultra-thin glass (UTG). However, embodiments are not limited thereto, and the specimen S may be formed of various materials such as plastic, metal, alloy, or the like.

The fixing member 120 may fix the specimen S to the upper surface 112 of the base plate 110. In an embodiment, the fixing member 120 may be movable in a direction perpendicular to a dropping direction (z-axis direction) of the collision member 130 on the upper surface 112 of the base plate 110. Accordingly, the specimen S may be movable on the upper surface 112 of the base plate 110, and a collision point at which the collision member 130 collides on the specimen S may be changed.

The collision member 130 may be dropped from an area above the specimen S and collide with the specimen S. The collision member 130 may apply an impact force to the specimen S by colliding with the specimen S, and a shape or material of the collision member 130 is not limited. For example, as illustrated in FIG. 1, the body of the collision member 130 may have a pen shape extending in the z-axis direction and a contact portion protruding in a lower direction from the body. For another example, the collision member 130 may have various shapes such as a ball, a rod, a hammer, or the like.

The guide bar 140 may be disposed on the base plate 110 and may extend in the z-axis direction. The guide bar 140 may be fixed to the upper surface 112 of the base plate 110.

The dropping unit 150 may be disposed on the base plate 110 and may overlap the specimen S in a vertical direction (the z-axis direction). The dropping unit 150 may drop the collision member 130 from the upper area of the specimen S to the specimen S.

In an embodiment, the dropping unit 150 may ascend and descend in the z-axis direction. For example, the dropping unit 150 may be connected to the guide bar 140 by a first connecting member 142. The first connecting member 142 may ascend and descend in the z-axis direction while being connected to the guide bar 140. Accordingly, a drop height of the collision member 130 dropped by the dropping unit 150 may be adjusted. Therefore, a magnitude of the impact force applied to the specimen S may be adjusted.

In an embodiment, the dropping unit 150 may include clamping members 152 configured to selectively clamp and unclamp the collision member 130 such that the collision member 130 may be dropped to the specimen S. The clamping members 152 may be disposed to surround the collision member 130 in a plan view, and may selectively clamp and unclamp a portion of the body of the collision member 130. For example, six clamping members 152 may be arranged to surround the collision member 130 at a constant angle (e.g., 60°) in a plan view. However, embodiments are not limited thereto, for example, 2 to 5 or 7 or more clamping members 152 may be arranged to surround the collision member 130 in a plan view.

As the first connecting member 142 ascends and descends in a state in which the fall dropping unit 150 clamps the collision member 130 using the clamping members 152, the drop height of the collision member 130 may be adjusted. When the adjustment of the drop height of the collision member 130 is completed, the clamping members 152 may open outward so that the clamping state of the collision member 130 may be released. Accordingly, the collision member 130 may free-fall to the specimen S, so that the collision member 130 may collide with the specimen S and apply the impact force to the specimen S.

The velocity measurement unit 160 may measure a collision velocity of the collision member 130 colliding with the specimen S. The collision velocity may be a velocity of the collision member 130 at which the collision member 130 collides with the specimen S (or just before the collision member 130 collides with the specimen S). For example, the velocity measurement unit 160 may include two infrared sensors spaced apart from each other in the z-axis direction to measure the collision velocity of the collision member 130.

In an embodiment, the velocity measurement unit 160 may be connected to the guide bar 140 by a second connecting member 144. A distance in the z-axis direction between the velocity measurement unit 160 and the base plate 110 (or the specimen S) may be kept constant. For example, the velocity measurement unit 160 may be spaced apart from the base plate 110 by an appropriate distance so that the infrared sensors may overlap the collision member 130 in a state in which the collision member 130 collides with the specimen S. Accordingly, the velocity measurement unit 160 may accurately measure the collision velocity, which is a velocity of the collision member 130 dropped from various heights when the collision member 130 collides with the specimen S (or just before the collision member 130 collides with the specimen S).

The evaluation unit 180 may evaluate an impact resistance of the specimen S based on the collision velocity of the collision member 130 measured by the velocity measurement unit 160 and an information about whether the specimen S is broken. For example, the information about whether the specimen S is broken may be obtained by a breakage detection unit (not illustrated) or may be input from a user.

In an embodiment, the collision velocity of the collision member 130 at which a probability of breakage of the specimen S is about 50% may be defined as $V_{50}$, and the impact resistance of the specimen S may be evaluated using the $V_{50}$. For example, the $V_{50}$ may be calculated by statistical estimation. The collision velocity of the collision member 130 may be divided into ranges. The collision member 130 may repeatedly collide with the specimen S while adjusting the drop height of the collision member 130 (i.e., adjusting the collision velocity of the collision member 130). The information about whether the specimen S is broken may be obtained each time by repeatedly colliding the collision member 130 with the specimen S more than a number of times for each range of the collision velocity. The probability of breakage of the specimen S may be calculated for each range of the collision velocity. As a width of each range of the collision velocity decreases and the number of times to collide the collision member 130 collides with the specimen S for each range increases, the value of $V_{50}$ may be accurately calculated. Based on the obtained data, the probability of breakage of the specimen S according to the collision velocity of the collision member 130 may be expressed as a graph of a cumulative distribution function (refer to FIG. 6), and may be normalized using a sigmoid function:

$$P = \frac{1}{1 + \exp(\alpha(V_{50} - x))} (x \geq 0)$$

In an embodiment, the evaluation unit 180 may calculate a representative value $V_{50}'$ representing the collision velocity $V_{50}$ of the collision member 130 when the probability of breakage of the specimen is about 50%, and may evaluate the impact resistance of the specimen S based on the calculated representative value $V_{50}'$.

In an embodiment, the collision member may be repeatedly dropped on the specimen S while increasing the drop height of the collision member 130 (i.e., increasing the collision velocity of the collision member 130) until the specimen S is broken. When the specimen S is broken, the specimen S may be replaced, and this may be repeated until the specimen S is broken a predetermined number of times. The evaluation unit 180 may calculate the representative value $V_{50}'$ based on first collision velocities and second collision velocities. The first collision velocities may include at least one collision velocity selected in a descending order from the highest collision velocity among the collision velocities at which the specimen S was not broken. At each of the collision velocity values included in the first collision velocities, the specimen S was not broken. The collision velocity values in the first collision velocities may include the highest of such values where the specimen S was not broken. At least one collision value may be included in the first collision velocities. The second collision velocities may include at least one collision velocity selected in an ascending order from the lowest collision velocity among the collision velocities at which the specimen S was broken. At each of the collision velocity values included in the second collision velocities, the specimen S was broken. The collision velocity values in the second collision velocities may include the lowest of such values where the specimen S was broken. At least one collision value may be included in the second collision velocities. The evaluation unit 180 may calculate the representative value $V_{50}'$ as an average value of the first collision velocities and the second collision velocities. For example, a number of the selected first collision velocities may be equal to a number of the second collision velocities. Increasing the number of the selected first and second collision velocities may increase the accuracy of the representative value $V_{50}'$ calculation. The evaluation unit 180 may evaluate the impact resistance of the specimen S based on the calculated representative value $V_{50}'$.

In case that the impact resistance of a specimen is evaluated based on a critical energy of the specimen (e.g., the drop height or the collision velocity of the collision member at which the specimen S is broken), the measure of critical energy may be inaccurate. If a collision member repeatedly collides with a specimen, a deviation of the critical energy of the specimen may occur due to surface defects in the specimen. When the impact resistance evaluation of specimens are based on the critical energy of the specimens, the number of collisions in which the collision member repeatedly collides with the specimens and the deviations of the critical energy of the specimens may not be reflected. Therefore, the result of the evaluation of the impact resistance of the specimen may be inaccurate, and it may be difficult to compare the impact resistance between specimens having different numbers of collisions.

According to embodiments, the evaluation unit 180 may calculate the representative value $V_{50}'$ representing the collision velocity $V_{50}$ of the collision member 130 when the probability of breakage of the specimen is about 50%, and may evaluate the impact resistance of the specimen S based on the calculated representative value $V_{50}'$. Therefore, the influence of the surface defects of the specimen S may be reflected in the result of the evaluation of the impact resistance of the specimen S. Accordingly, it is possible to quantitatively evaluate the impact resistance of the specimen S, and effectively compare the impact resistance between different specimens (e.g., specimens having different number of collisions). Thus, the reliability of the impact resistance evaluation by the impact test apparatus 100 may be improved.

Figure 2:
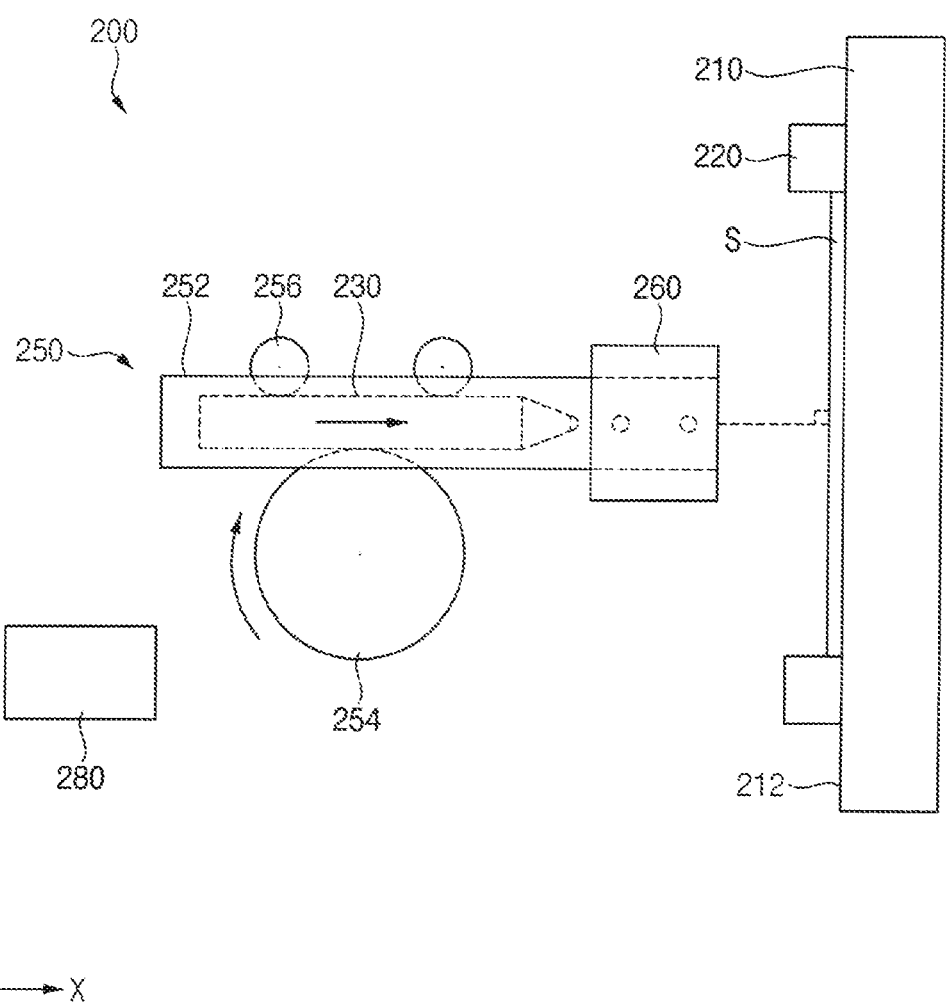
FIG. 2 is a front view schematically illustrating an impact test apparatus according to an embodiment.
Figure 3:
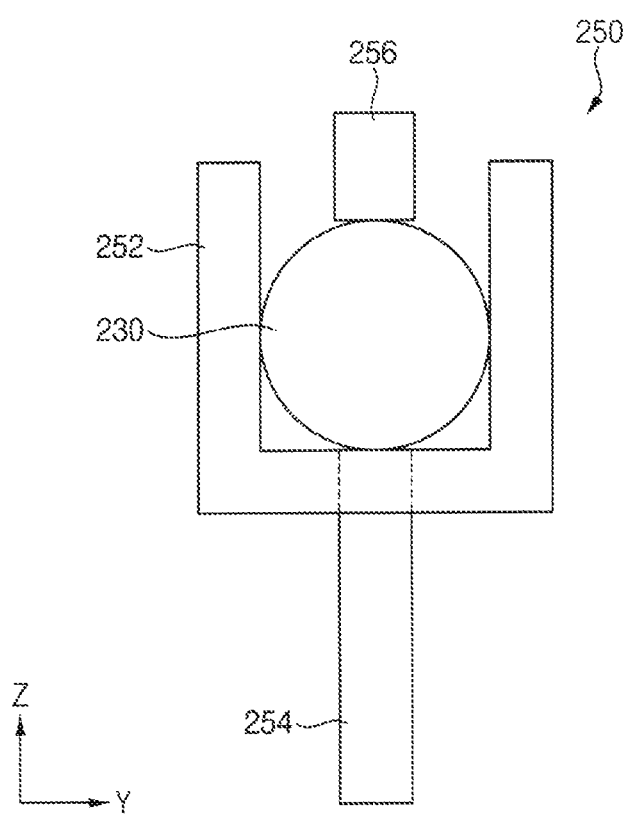
FIG. 3 is a side view schematically illustrating a shooting unit included in the impact test apparatus of FIG. 2.

FIG. 2 is a front view schematically illustrating an impact test apparatus according to an embodiment. FIG. 3 is a side view schematically illustrating a shooting unit included in the impact test apparatus of FIG. 2.

Referring to FIGS. 2 and 3, an impact test apparatus 200 according to an embodiment may include a base plate 210, a fixing member 220, a collision member 230, a shooting unit 250, a velocity measurement unit 260, and an evaluation unit 280. Hereinafter, descriptions of elements that are common with the embodiments described above for impact test apparatus 100 and previously described with reference to FIG. 1 may be omitted or simplified.

The shape of the base plate 210 may a flat plate having a thickness. For example, a side surface 212 of the base plate 210 may be substantially parallel to an y-z plane.

A specimen S may be placed on the side surface 212 of the base plate 210. The specimen S is an object of the impact test apparatus 200, for example, at least a portion of the specimen S may be shaped as a flat plate having a thickness. For example, the specimen S may include (or may be) a cover window included in a display device. For example, the cover window may include UTG.

The fixing member 220 may fix the specimen S to the side surface 212 of the base plate 210. In an embodiment, the fixing member 120 may be movable in a direction perpendicular to a shooting direction (x-axis direction) of the collision member 230 on the side surface 212 of the base plate 210. Accordingly, the specimen S may be movable on the side surface 212 of the base plate 210, and a collision point at which the collision member 230 collides on the specimen S may be changed.

The collision member 230 may be shot from a side area (e.g., a left side area in FIG. 2) of the specimen S and collide with the specimen S. The collision member 230 may apply an impact force to the specimen S by colliding with the specimen S, and the embodiments are not limited by the shape or material of the collision member 230.

The shooting unit 250 may be disposed at a side of the base plate 210 and may overlap the specimen S in a horizontal direction (the x-axis direction). The shooting unit 250 may shoot the collision member 230 from the side area of the specimen S to the specimen S.

In an embodiment, the shooting unit 250 may include a supporting member 252 and a rotating member 254. The supporting member 252 may extend in the shooting direction (x-axis direction). The supporting member 252 may have a groove extending the shooting direction and in which the collision member 230 is placed.

The rotating member 254 may rotate about a rotation axis extending in a direction (e.g., y-axis direction) perpendicular to the shooting direction. For example, the rotating member 254 may contact the collision member 230. When the rotation member 254 contacting the collision member 230 rotates in, for example, a clockwise direction about the rotation axis, the collision member 230 placed in the groove of the supporting member 252 may be shot to the specimen S. The rotation speed of the rotating member 254 may be adjustable. Accordingly, a shooting velocity of the collision member 230 shot to the specimen S may be adjusted. Therefore, a magnitude of the impact force applied to the specimen S may be adjusted.

In an embodiment, as illustrated in the drawing, when the rotating member 254 is disposed under the collision member 230, an opening into which the rotating member 254 is inserted may be formed on a lower surface of the supporting member 252. A roller 256 may be disposed on the collision member 230 to prevent the collision member 230 from moving up and down. The roller 256 may be rotatable about a rotational axis extending in the y-axis direction, so that the roller 256 may not interfere with shooting of the collision member 230. In an embodiment, the rotating member 254 may be disposed on the collision member 230.

The velocity measurement unit 260 may measure a collision velocity of the collision member 230 colliding with the specimen S. The collision velocity may be a velocity of the collision member 230 at which the collision member 230 collides with the specimen S (or just before the collision member 230 collides with the specimen S). For example, the velocity measurement unit 260 may include two infrared sensors spaced apart from each other in the x-axis direction to measure the collision velocity of the collision member 230.

In an embodiment, a distance in the x-axis direction between the velocity measurement unit 260 and the base plate 210 (or the specimen S) may be kept constant. For example, the velocity measurement unit 260 may be spaced apart from the base plate 210 by an appropriate distance so that the infrared sensors may overlap the collision member 230 in a state in which the collision member 230 collides with the specimen S. Accordingly, the velocity measurement unit 260 may accurately measure the collision velocity, which is a velocity of the collision member 230 shot at various shooting velocities when the collision member 230 collides with the specimen S (or just before the collision member 230 collides with the specimen S).

The evaluation unit 280 may evaluate an impact resistance of the specimen S based on the collision velocities of the collision member 230 measured by the velocity measurement unit 260 and based on information about whether the specimen S is broken. For example, the information about whether the specimen S is broken may be obtained by a breakage detection unit (not illustrated) or may be input by a user.

In an embodiment, the evaluation unit 280 may calculate a representative value $V_{50}'$ representing the collision velocity $V_{50}$ of the collision member 230 when the probability of breakage of the specimen is about 50%, and may evaluate the impact resistance of the specimen S based on the calculated representative value $V_{50}'$.

In an embodiment, the collision member may be repeatedly shot to the specimen S while increasing the rotation speed of the rotating member 254 (i.e., increasing the collision velocity of the collision member 230) until the specimen S is broken. When the specimen S is broken, the specimen S may be replaced, and this may be repeated until the specimen S is broken a predetermined number of times. The evaluation unit 280 may calculate the representative value $V_{50}'$ based on a first collision velocities and a second collision velocities. The first collision velocities may include at least one collision velocity selected in a descending order from the highest collision velocity among the collision velocities at which the specimen S was not broken. At each of the collision velocity values included in the first collision velocities, the specimen S was not broken. The collision velocity values in the first collision velocities may include the highest of such values where the specimen S was not broken. At least one collision value may be included in the first collision velocities. The second collision velocity may include at least one collision velocity selected in an ascending order from the lowest the collision velocity among the collision velocities at which the specimen S was broken. At each of the collision velocity values included in the second collision velocities, the specimen S was broken. The collision velocity values in the second collision velocities may include the lowest of such values where the specimen S was broken. At least one collision value may be included in the second collision velocities. The evaluation unit 280 may calculate the representative value $V_{50}'$ as an average value of the first collision velocities and the second collision velocities. For example, a number of the selected first collision velocities may be equal to a number of the second collision velocities. Increasing the number of the selected first and second collision velocities may increase accuracy of the representative value $V_{50}'$ calculation. The evaluation unit 280 may evaluate the impact resistance of the specimen S based on the calculated representative value $V_{50}'$.

In case that the impact resistance of a specimen is evaluated based on a critical energy of the specimen (e.g., the shooting velocity or the collision velocity of the collision member at which the specimen S is broken), the measure of the critical energy may be inaccurate. If a collision member repeatedly collides with a specimen, a deviation of the critical energy of the specimen may occur due to surface defects of the specimen. When the impact resistance evaluation of specimens are based on the critical energy of specimens, the number of collisions in which the collision member repeatedly collides with specimens and the deviations of the critical energy of the specimens may not be reflected. Therefore, a result of the evaluation of the impact resistance of the specimen may be inaccurate, and it may be difficult to compare the impact resistance between specimens having different numbers of collisions.

According to embodiments, the evaluation unit 280 may calculate the representative value $V_{50}'$ representing the collision velocity $V_{50}$ of the collision member 230 when the probability of breakage of the specimen is about 50%, and may evaluate the impact resistance of the specimen S based on the calculated representative value $V_{50}'$. Therefore, the influence of the surface defects of the specimen S may be reflected in the result of the evaluation of the impact resistance of the specimen S. Accordingly, it is possible to quantitatively evaluate the impact resistance of the specimen S, and effectively compare the impact resistance between different specimens (e.g., specimens having different number of collisions). Thus, the reliability of the impact resistance evaluation by the impact test apparatus 200 may be improved.

Figure 4:
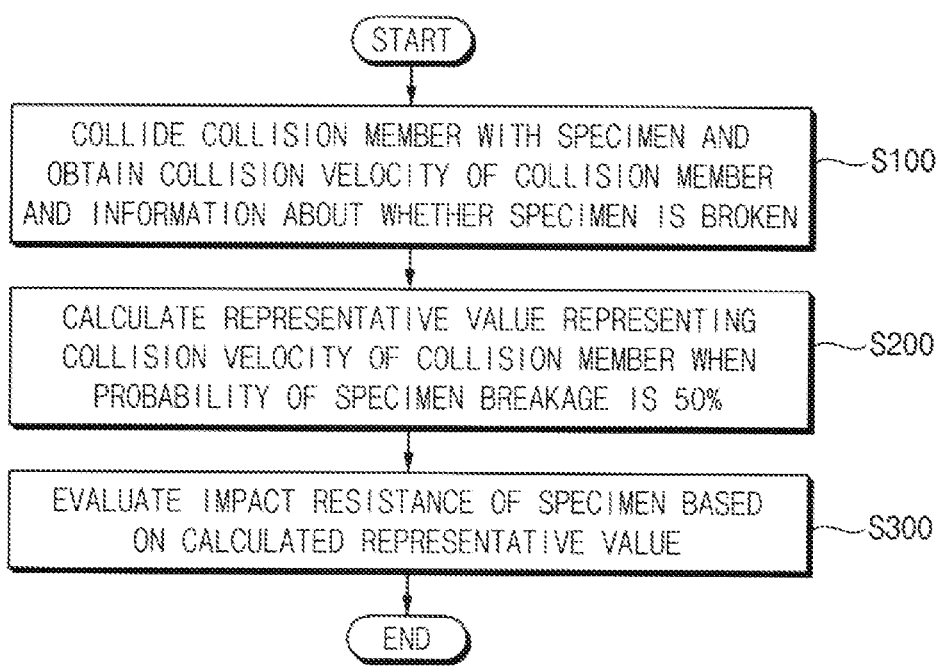
FIG. 4 is a flowchart illustrating an impact test method according to an embodiment.
Figure 5:
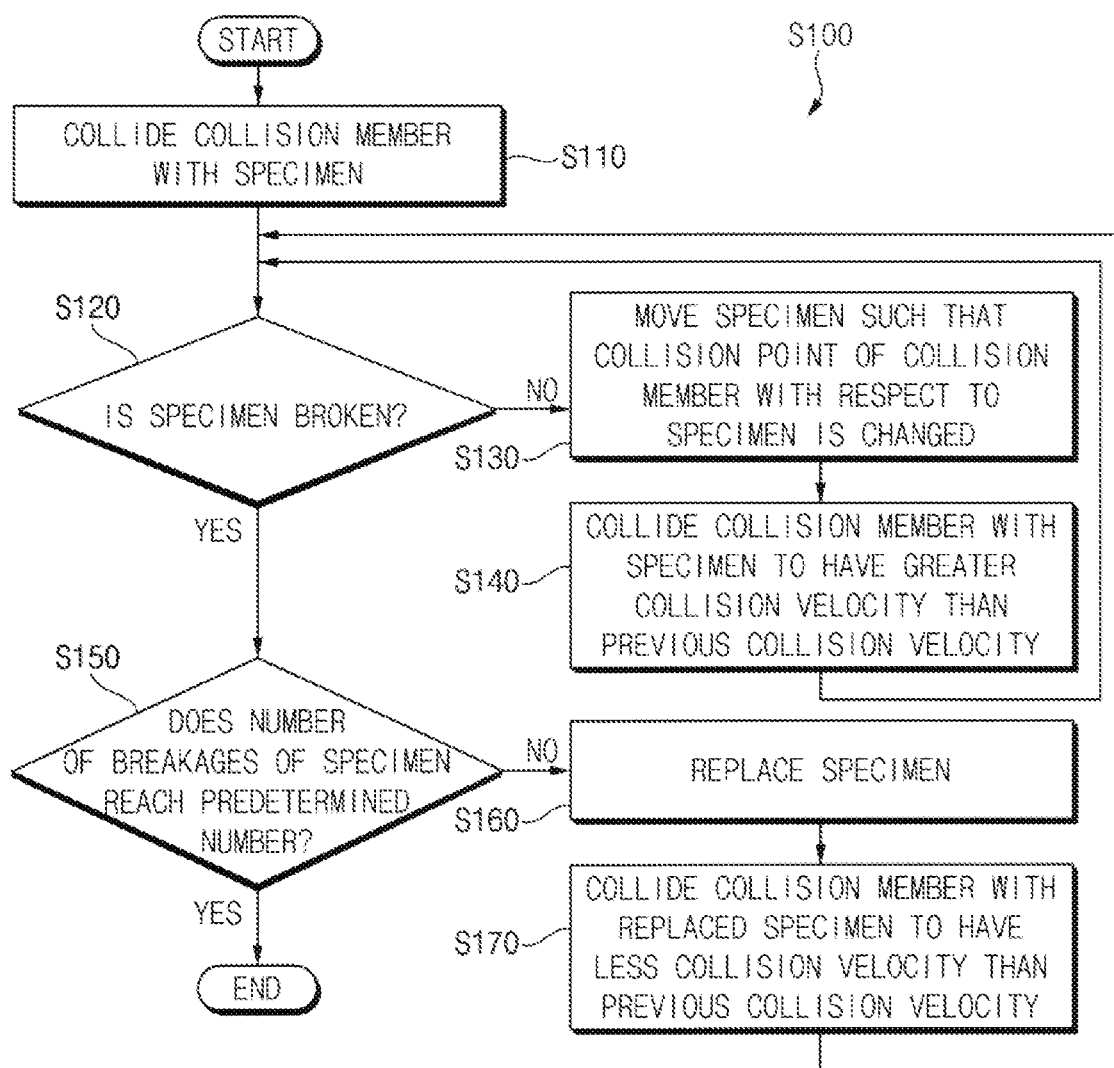
FIG. 5 is a flowchart illustrating a method for colliding a collision member according to an embodiment.

FIG. 4 is a flowchart illustrating an impact test method according to an embodiment. FIG. 5 is a flowchart illustrating an colliding a collision member according to an embodiment.

In embodiments, an impact test method according to an embodiment described with reference to FIGS. 4 and 5 may be performed using the impact test apparatus 100 of FIG. 1 or the impact test apparatus 200 of FIG. 2. Hereinafter, an example of performing the impact test method according to an embodiment using the impact test apparatus 100 of FIG. 1 will be described.

Referring to FIGS. 1, 4, and 5, the impact test apparatus 100 may collide the collision member 130 with the specimen S, and may obtain the collision velocity of the collision member 130 and the information about whether the specimen S is broken (step S100).

In the step S100, the impact test apparatus 100 may drop the collision member 130 to the specimen S while increasing the drop height of the collision member 130 (i.e., increasing the collision velocity of the collision member 130) until the specimen S is broken. When the specimen S is broken, the specimen S may be replaced, and this may be repeated until a number of breakages of the specimens S reaches a predetermined number.

In an embodiment, the collision member 130 may collide with a first specimen S at a predetermined collision velocity (step S110). For example, the dropping unit 150 may drop the collision member 130 to the first specimen at a first drop height.

After the collision member 130 collides with the first specimen S at the predetermined collision velocity, information about whether the first specimen S is broken may be obtained (step S120). For example, the information about whether the first specimen S is broken may be obtained by the breakage detection unit or may be input from the user.

If the first specimen S is not broken, the first specimen S may be moved so that the collision point at which the collision member 130 collides on the first specimen S may be changed (step S130). For example, the first specimen S may be moved by changing (or adjusting) a position of the fixing member 120 on the upper surface 112 of the base plate 110.

Subsequently, the collision member 130 may collide with the specimen to have a collision velocity greater than the previous collision velocity (i.e., the predetermined collision velocity) (step S140). For example, the dropping unit 150 may drop the collision member 130 to the first specimen at a second drop height greater than the first drop height. After the collision member 130 collides with the first specimen S at the greater collision velocity, the information about whether the first specimen is broken may be obtained again (step S120).

If the first specimen S is broken, the number of breakages of specimens S may be compared with a predetermined number (step S150).

If the number of breakages of the specimens S has not reached the predetermined number, the broken first specimen may be replaced with a new second specimen S (step S160). For example, the second specimen S may have the substantially same characteristics as the first specimen S. For example, the first specimen and the second specimen may be formed of a same material, and the first and second specimens may have substantially a same thickness.

Subsequently, the collision member 130 may collide with the second specimen S at a collision velocity less than a previous collision velocity (i.e., the predetermined collision velocity) (step S170). For example, the dropping unit 150 may drop the collision member 130 to the second specimen at a third drop height less than the first drop height. After the collision member 130 collides with the second specimen S at the collision velocity less than the previous collision velocity, information about whether the second specimen is broken may be obtained (step S120).

If the number of breakages of the specimens reaches the predetermined number, the step S100 may be completed.

The impact test apparatus 100 may calculate the representative value $V_{50}'$ of the collision velocity $V_{50}$ of the collision member 130 at which the probability of breakage of the specimen is about 50% (step S200).

In an embodiment, the evaluation unit 180 may select at least one first collision velocity in a descending order from the highest collision velocity among the collision velocities at which the specimen S was not broken, and may select at least one second collision velocity in an ascending order from the lowest collision velocity among the collision velocities at which the specimen is broken. The number of the selected first collision velocities may be equal to the number of the selected second collision velocities. The evaluation unit 180 may calculate the representative value $V_{50}{}'$ for evaluating the impact resistance of the specimen S based on the first collision velocities and the second collision velocities. For example, the evaluation unit 180 may calculate the representative value $V_{50}{}'$ as an average value of the first collision velocities and the second collision velocities. As the number of the selected first and second collision velocities increases, the accuracy of the calculation of the representative value $V_{50}{}'$ may increase.

The impact test apparatus 100 may evaluate the impact resistance of the specimen S based on the calculated representative value $V_{50}{}'$ (step S300). Therefore, the influence of the surface defects of the specimen S may be reflected (and controlled for) in the result of the evaluation of the impact resistance of the specimen S. Accordingly, it is possible to quantitatively evaluate the impact resistance of the specimen S, and effectively compare the impact resistance between different specimens (e.g., specimens having different number of collisions). Accordingly, the reliability of the impact resistance evaluation by the impact test method may be improved.

Hereinafter, an effect of the embodiments will be described in further detail with reference to specific experimental examples.

EXPERIMENTAL EXAMPLE 1

An UTG specimen having a thickness of about 50 μm was prepared, and the specimen was attached to a polymer sheet to which an adhesive was applied. The specimen attached to the polymer sheet was placed on the upper surface of the base plate. As the collision member, a BIC® ORANGE™ FINE ballpoint pen having a point diameter of about 0.7 mm and a weight of about 5.84 g was used. An initial drop height of the ballpoint pen was adjusted such that the tip of the ballpoint pen was spaced apart from the base plate by about 1 cm (a drop height of about 1 cm). The ballpoint pen was dropped on the specimen, and the collision velocity of the ballpoint pen and information about whether the specimen is broken were obtained. When the specimen was not broken, the specimen was moved in the x-axis direction by about 1 cm and in the y-axis direction by about 1 cm, the drop height of the ballpoint pen was increased by about 1 cm, and this was repeated until the specimen was broken. When the specimen was broken, the broken specimen was replaced with another specimen of the same thickness and material (an UTG specimen having a thickness of about 50 μm). An initial drop height of the ballpoint pen was adjusted to be about 2 cm lower than the drop height at which the specimen was broken, and the ballpoint pen was dropped on the replaced specimen according to the method described above. This was repeated until the UTG specimens were broken 5 times. Three collision velocities were selected in a descending order from the highest collision velocity among the collision velocities at which the UTG specimens were not broken, and three collision velocities were selected in an ascending order from the lowest collision velocity among the collision velocities at which the UTG specimens were broken. The representative value $V_{50}{}'$ was calculated as an average value of the selected six collision velocities.

EXPERIMENTAL EXAMPLE 2

An impact test of the specimen was performed in the same manner as in the experimental example 1, except that the thickness of the UTG specimen was about 70 μm.

EXPERIMENTAL EXAMPLE 3

An impact test of the specimen was performed in the same manner as in the experimental example 1, except that the thickness of the UTG specimen was about 100 μm.

Figure 6:
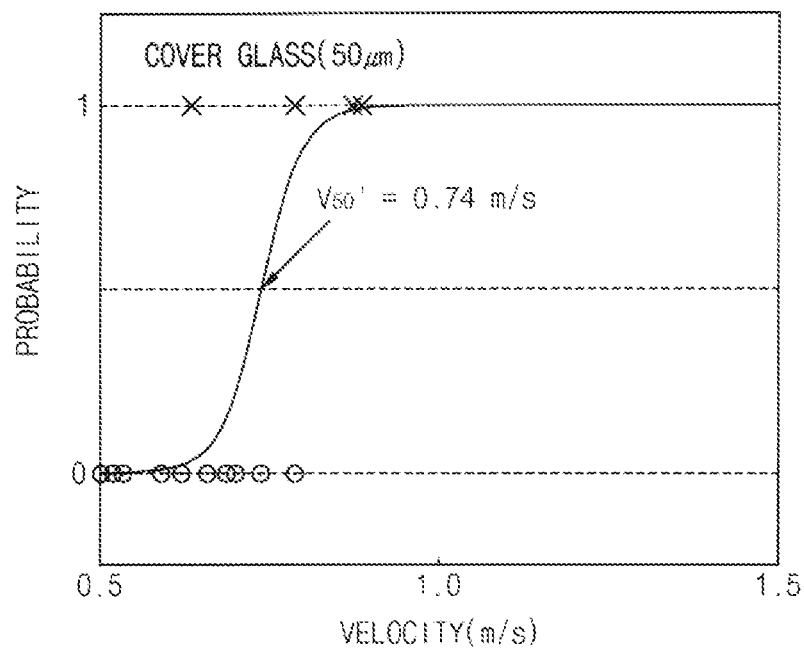
FIG. 6 is a graph illustrating a collision velocity and a probability of breakage of a specimen according to an experimental example 1.

FIG. 6 is a graph illustrating a collision velocity and a probability of breakage of a specimen according to an experimental example 1.

A results of the experimental example 1 are illustrated in table 1 and FIG. 6. The representative value $V_{50}{}'$ of the experimental example 1 was calculated as about 0.74 m/s.

TABLE 1

| Collision velocity (m/s) | breakage |
|---|---|
| 0.19 | No |
| 0.37 | No |
| 0.43 | No |
| 0.47 | No |
| 0.47 | No |
| 0.49 | No |
| 0.51 | No |
| 0.52 | No |
| 0.52 | No |
| 0.54 | No |
| 0.59 | No |
| 0.62 | No |
| 0.63 | Yes |
| 0.66 | No |
| 0.69 | No |
| 0.69 | No |
| 0.70 | No |
| 0.74 | No |
| 0.79 | Yes |
| 0.79 | No |
| 0.79 | Yes |
| 0.87 | Yes |
| 0.89 | Yes |

A results of the experimental example 2 are illustrated in table 2. The representative value $V_{50}{}'$ of the experimental example 2 was calculated as about 1.15 m/s.

TABLE 2

| Collision velocity (m/s) | breakage |
|---|---|
| 0.54 | No |
| 0.62 | No |
| 0.69 | No |
| 0.70 | No |
| 0.71 | No |
| 0.78 | No |
| 0.79 | No |
| 0.81 | No |
| 0.81 | No |
| 0.83 | No |
| 0.83 | No |
| 0.85 | No |
| 0.89 | No |
| 0.92 | No |
| 0.93 | No |
| 0.95 | No |
| 0.97 | Yes |
| 0.97 | Yes |
| 0.98 | No |
| 1.02 | No |
| 1.06 | No |
| 1.08 | No |
| 1.15 | No |
| 1.15 | Yes |
| 1.16 | Yes |
| 1.17 | No |
| 1.22 | No |
| 1.26 | No |

TABLE 2-continued

| Collision velocity (m/s) | breakage |
|---|---|
| 1.32 | No |
| 1.36 | Yes |

A results of the experimental example 3 are illustrated in table 3. The representative value $V_{50}'$ of the experimental example 3 was calculated as about 1.51 m/s.

TABLE 3

| Collision velocity (m/s) | breakage |
|---|---|
| 0.69 | No |
| 0.99 | No |
| 1.04 | No |
| 1.08 | No |
| 1.17 | No |
| 1.26 | No |
| 1.30 | No |
| 1.32 | No |
| 1.32 | Yes |
| 1.33 | No |
| 1.33 | No |
| 1.35 | Yes |
| 1.38 | No |
| 1.42 | No |
| 1.46 | No |
| 1.49 | No |
| 1.51 | No |
| 1.54 | No |
| 1.56 | No |
| 1.58 | Yes |
| 1.60 | No |
| 1.62 | Yes |
| 1.65 | No |
| 1.74 | Yes |

Figure 7:
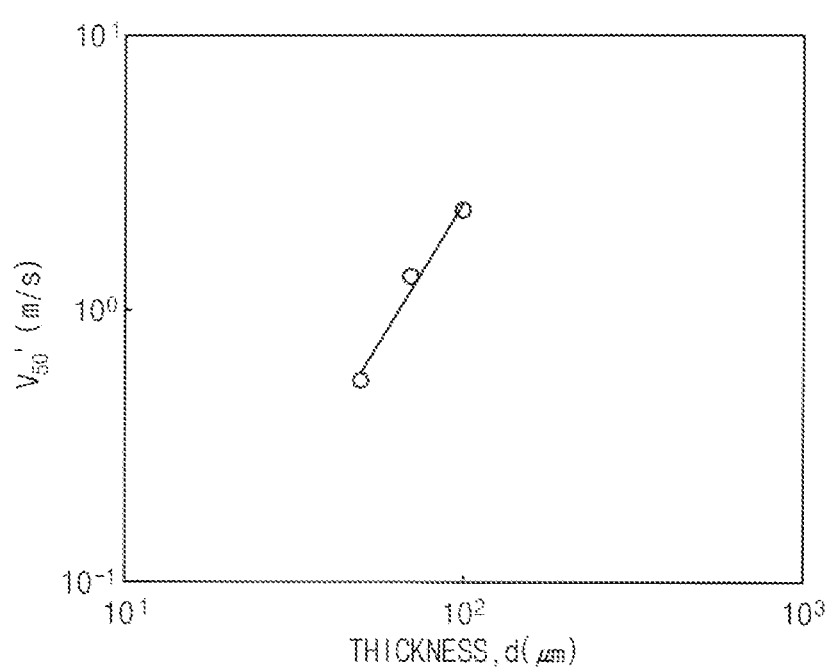
FIG. 7 is a graph illustrating a thickness of a specimen and calculated representative values according to experimental examples 1 to 3.

FIG. 7 is a graph illustrating a thickness of a specimen and a calculated representative value according to experimental examples 1 to 3.

Referring to FIG. 7, the representative value $V_{50}'$ representing the collision velocity $V_{50}$ of the collision member at which the probability of breakage of the specimen is about 50% is increased as the thickness of the UTG specimen is increased. For example, it can be noted that the impact resistance of the specimen is increased as the thickness of the UTG specimen increases, and the increase in the impact resistance is sufficiently reflected in the representative value $V_{50}'$. The square of the representative value $V_{50}'$ ($[V_{50}']^2$) is proportional to the thickness of the specimen raised to about the 2.05-th power (thickness$^{-2.05}$) which is consistent with the results of existing studies about the dynamic fracture behavior of glass materials. Therefore, instead of the critical energy of the specimen (i.e., the drop height or collision velocity of the collision member when the specimen is broken), the impact resistance of the specimen may be evaluated by the collision velocity $V_{50}$ when the probability of breakage of the specimen is about 50% as defined in the embodiments (or, the representative value $V_{50}'$ representing the collision velocity $V_{50}$). The change in the impact resistance of the specimen is sufficiently reflected in the $V_{50}$.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. An impact test apparatus comprising:
    a base plate including an upper surface on which a specimen is placed;
    a collision member that collides with the specimen;
    a dropping unit that drops the collision member from an upper area of the specimen to the specimen and adjusts a height that the collision member drops;
    a velocity measurement unit that measures a collision velocity of the collision member when the collision member collides with the specimen; and
    an evaluation unit that produces a representative value that is a collision velocity at which a probability of breakage of the specimen is about 50%, and evaluates an impact resistance of the specimen based on the representative value.

2. The impact test apparatus of claim 1, wherein
    the evaluation unit produces the representative value based on at least one first collision velocity and at least one second collision velocity, the at least one first collision velocity is selected among collision velocities at which the specimen is not broken, and
    the at least one second collision velocity is selected among collision velocities at which the specimen is broken.

3. The impact test apparatus of claim 2, wherein a number of first collision velocities selected among the collision velocities at which the specimen is not broken is equal to a number of second collision velocities selected among the collision velocities at which the specimen is broken.

4. The impact test apparatus of claim 2, wherein the evaluation unit produces the representative value as an average value of the at least one first collision velocity and the at least one second collision velocity.

5. The impact test apparatus of claim 1, further comprising a fixing member that fixes the specimen to the upper surface of the base plate and is movable in a direction perpendicular to a dropping direction of the collision member.

6. The impact test apparatus of claim 1, wherein the dropping unit includes a clamping member that selectively clamps and unclamps the collision member so that the collision member is dropped towards the specimen.

7. An impact test apparatus comprising:
    a base plate having a side surface on which a specimen is placed;
    a collision member that collides with the specimen;
    a shooting unit that shoots the collision member from a side area of the specimen to the specimen and adjusts a shooting velocity of the collision member;
    a velocity measurement unit that measures a collision velocity of the collision member when the collision member collides with the specimen; and
    an evaluation unit that produces a representative value that is a collision velocity at which a probability of breakage of the specimen is about 50%, and evaluates an impact resistance of the specimen based on the representative value.

8. The impact test apparatus of claim 7, wherein
    the evaluation unit produces the representative value based on at least one first collision velocity and at least one second collision velocity, the at least one first collision velocity is selected among collision velocities at which the specimen is not broken, and the at least one second collision velocity is selected among collision velocities at which the specimen is broken.

9. The impact test apparatus of claim 8, wherein a number of first collision velocities selected among the collision velocities at which the specimen is not broken is equal to a number of second collision velocities selected among the collision velocities at which the specimen is broken.

10. The impact test apparatus of claim 8, wherein the evaluation unit produces the representative value as an average value of the at least one first collision velocity and the at least one second collision velocity.

11. The impact test apparatus of claim 7, further comprising a fixing member that fixes the specimen to the side surface of the base plate and is movable in a direction perpendicular to a shooting direction of the collision member.

12. The impact test apparatus of claim 7, wherein the shooting unit includes:

a supporting member extending in a shooting direction of the collision member, the supporting member including a groove in which the collision member is placed; and a rotating member that rotates about a rotational axis extending in a direction perpendicular to the shooting direction of the collision member, and contacts the collision member such that the collision member is shot to the specimen, the rotating member having an adjustable rotation speed.

13. An impact test method comprising:

repeatedly colliding a collision member with a specimen;

measuring collision velocities at which the collision member and the specimen collides;

obtaining information about whether the specimen is broken when the collision member collides with the specimen;

calculating a representative value representing a collision velocity at which a probability of breakage of the specimen is about 50%; and evaluating an impact resistance of the specimen based on the representative value.

14. The impact test method of claim 13, wherein the repeatedly colliding of the collision member includes changing each of the collision velocities at which the collision member collides with the specimen.

15. The impact test method of claim 13, wherein the repeatedly colliding of the collision member includes:

colliding the collision member with a first specimen at a predetermined collision velocity;

in case that the specimen is not broken, colliding the collision member with the first specimen at another collision velocity greater than the predetermined collision velocity, and in case that the first specimen is broken, replacing the first specimen with a second specimen, and colliding the collision member with the second specimen at another collision velocity less than the predetermined collision velocity.

16. The impact test method of claim 15, wherein, the repeatedly colliding of the collision member further includes:

in case that the first specimen is not broken, moving the first specimen such that a collision point of the collision member with respect to the first specimen is changed.

17. The impact test method of claim 16, wherein the first specimen is moved in a direction perpendicular to a collision direction of the collision member.

18. The impact test method of claim 13, wherein the representative value is calculated based on at least one first collision velocity and at least one second collision velocity, the at least one first collision velocity is selected among collision velocities at which the specimen is not broken, and the at least one second collision velocity is selected among collision velocities at which the specimen is broken.

19. The impact test method of claim 18, wherein a number of first collision velocities selected among the collision velocities at which the specimen is not broken is equal to a number of second collision velocities selected among the collision velocities at which the specimen is broken.

20. The impact test method of claim 18, wherein the calculating of the representative value includes calculating an average value of the at least one first collision velocity and the at least one second collision velocity.

* * * * *